US011735992B2

(12) United States Patent
Diehl et al.

(10) Patent No.: US 11,735,992 B2
(45) Date of Patent: Aug. 22, 2023

(54) TUNING OF A KINEMATIC RELATIONSHIP BETWEEN MEMBERS

(71) Applicant: EDDY CURRENT LIMITED PARTNERSHIP, Wellington (NZ)

(72) Inventors: Andrew Karl Diehl, Wellington (NZ); Christopher James Allington, Wellington (NZ)

(73) Assignee: EDDY CURRENT LIMITED PARTNERSHIP, Christchurch (NZ)

( * ) Notice: Subject to any disclaimer, the term of this patent is extended or adjusted under 35 U.S.C. 154(b) by 0 days.

(21) Appl. No.: 17/972,443

(22) Filed: Oct. 24, 2022

(65) Prior Publication Data
US 2023/0111414 A1    Apr. 13, 2023

Related U.S. Application Data

(63) Continuation of application No. 16/592,688, filed on Oct. 3, 2019, now Pat. No. 11,515,776, which is a
(Continued)

(30) Foreign Application Priority Data

Aug. 18, 2014  (NZ) ........................................ 627633

(51) Int. Cl.
*F16F 15/02*  (2006.01)
*H02K 49/04*  (2006.01)
(Continued)

(52) U.S. Cl.
CPC ............ *H02K 49/046* (2013.01); *A62B 1/08* (2013.01); *B60R 22/343* (2013.01); *B60R 22/36* (2013.01);
(Continued)

(58) Field of Classification Search
CPC .... H02K 49/046; H02K 2213/09; A62B 1/06; A62B 1/08; B60R 22/343; B60R 22/36; B60R 2022/466; F16D 63/008
(Continued)

(56) References Cited

U.S. PATENT DOCUMENTS 2,058,024 A  10/1936 Logan, Jr.
2,122,312 A   6/1938 Cassion
(Continued)

FOREIGN PATENT DOCUMENTS

CN      1783674 A     6/2006
CN    101820952 A     9/2010
(Continued)

OTHER PUBLICATIONS

Extended European Search Report, dated Mar. 29, 2018, for European Application No. 15834380.6-1201, (12 pages).
(Continued)

*Primary Examiner* — Christopher P Schwartz
(74) *Attorney, Agent, or Firm* — Seed IP Law Group LLP

(57) ABSTRACT

Described herein is a device comprising members in a kinematic relationship. The kinematic relationship is at least partially governed by at least one magnetic flux interaction that, in effect, may provide a tunable resistance to movement, changing the rate of relative movement between the members. In one embodiment, the device comprises a first member in a kinematic relationship with at least one further member to form a system. The system moves within a limited range of motion and the system interacts when an external energizing force is imposed on the system causing the members to respond due to their kinematic and dynamic characteristics and thereby creating relative motion between the members. The trigger member is coupled to the at least the first member and moves in response to a pre-determined
(Continued)

system movement. When the trigger member moves, the trigger member imposes a braking action on the system or a member or members thereof. The speed and/or intensity of the braking action imposed by the trigger member on the system or a member or members thereof is controlled by the trigger member rate of movement. This rate of movement is in turn governed by a magnetic flux interaction between the trigger member and the at least one first member causing formation of a magnetically induced eddy current force between the parts.

14 Claims, 5 Drawing Sheets

Related U.S. Application Data continuation of application No. 15/504,636, filed as application No. PCT/NZ2015/050114 on Aug. 18, 2015, now Pat. No. 10,498,210.

(51) Int. Cl.
  *A62B 1/08* (2006.01)
  *B60R 22/343* (2006.01)
  *B60R 22/36* (2006.01)
  *F16D 63/00* (2006.01)
  *A62B 1/06* (2006.01)
  *B60R 22/46* (2006.01)

(52) U.S. Cl.
  CPC .............. *F16D 63/008* (2013.01); *A62B 1/06* (2013.01); *B60R 2022/4666* (2013.01); *H02K 2213/09* (2013.01)

(58) Field of Classification Search
  USPC ............. 188/65.1, 65.8, 82.7, 156–164, 267; 192/54.31, 54.4, 84.51, 84.93; 242/288; 254/267; 310/105; 482/5, 6, 903
  See application file for complete search history.

(56) References Cited

U.S. PATENT DOCUMENTS

| | | |
|---|---|---|
| 2,122,315 A | 6/1938 | Fosty et al. |
| 2,272,509 A | 2/1942 | Cavallo |
| 2,409,009 A | 10/1946 | Bakke |
| 2,428,104 A | 9/1947 | Winther |
| 2,437,871 A | 4/1948 | Wood |
| 2,492,776 A | 12/1949 | Winther |
| 2,771,171 A | 11/1956 | Schultz |
| 2,807,734 A | 9/1957 | Lehde |
| 3,364,795 A | 1/1968 | De Coye De Castelet |
| 3,447,006 A | 5/1969 | Bair |
| 3,721,394 A | 3/1973 | Reiser |
| 3,868,005 A | 2/1975 | McMillan |
| 3,934,446 A | 1/1976 | Avitzur |
| 3,962,595 A | 6/1976 | Eddens |
| 3,967,794 A | 7/1976 | Fohl |
| 4,078,719 A | 3/1978 | Durland et al. |
| 4,093,186 A | 6/1978 | Golden |
| 4,224,545 A | 9/1980 | Powell |
| 4,271,944 A | 6/1981 | Hanson |
| 4,306,688 A | 12/1981 | Hechler, IV |
| 4,416,430 A | 11/1983 | Totten |
| 4,434,971 A | 3/1984 | Cordrey |
| 4,544,111 A | 10/1985 | Nakajima |
| 4,561,605 A | 12/1985 | Nakajima |
| 4,567,963 A | 2/1986 | Sugimoto |
| 4,612,469 A | 9/1986 | Muramatsu |
| 4,676,452 A | 6/1987 | Nakajima |
| 4,690,066 A | 9/1987 | Morishita et al. |
| 4,729,525 A | 3/1988 | Rumpf |
| 4,826,150 A | 5/1989 | Minoura |
| 4,846,313 A | 7/1989 | Sharp |
| 4,895,317 A | 1/1990 | Rumpf et al. |
| 4,938,435 A | 7/1990 | Varner et al. |
| 4,957,644 A | 9/1990 | Price et al. |
| 4,974,706 A | 12/1990 | Maji et al. |
| 5,054,587 A | 10/1991 | Matsui et al. |
| 5,064,029 A | 11/1991 | Araki et al. |
| 5,084,640 A | 1/1992 | Morris et al. |
| 5,205,386 A | 4/1993 | Goodman et al. |
| 5,248,133 A | 9/1993 | Okamoto et al. |
| 5,272,938 A | 12/1993 | Hsu et al. |
| 5,342,000 A | 8/1994 | Berges et al. |
| 5,392,881 A | 2/1995 | Cho et al. |
| 5,441,137 A | 8/1995 | Organek et al. |
| 5,465,815 A | 11/1995 | Ikegami |
| 5,477,093 A | 12/1995 | Lamb |
| 5,483,849 A | 1/1996 | Orii et al. |
| 5,495,131 A | 2/1996 | Goldie et al. |
| 5,636,804 A | 6/1997 | Jeung |
| 5,692,693 A | 12/1997 | Yamaguchi |
| 5,711,404 A | 1/1998 | Lee |
| 5,712,520 A | 1/1998 | Lamb |
| 5,722,612 A | 3/1998 | Feathers |
| 5,742,986 A | 4/1998 | Corrion et al. |
| 5,779,178 A | 7/1998 | McCarty |
| 5,791,584 A | 8/1998 | Kuroiwa |
| 5,822,874 A | 10/1998 | Nemes |
| 5,862,891 A | 1/1999 | Kroger et al. |
| 5,928,300 A | 7/1999 | Rogers et al. |
| 6,041,897 A | 3/2000 | Saumweber et al. |
| 6,042,517 A | 3/2000 | Gunther et al. |
| 6,051,897 A | 4/2000 | Wissler et al. |
| 6,062,350 A | 5/2000 | Spieldiener et al. |
| 6,086,005 A | 7/2000 | Kobayashi et al. |
| 6,209,688 B1 | 4/2001 | Kuwahara |
| 6,220,403 B1 | 4/2001 | Kobayashi et al. |
| 6,279,682 B1 | 8/2001 | Feathers |
| 6,293,376 B1 | 9/2001 | Pribonic |
| 6,412,611 B1 | 7/2002 | Pribonic |
| 6,460,828 B1 | 10/2002 | Gersemsky et al. |
| 6,466,119 B1 | 10/2002 | Drew |
| 6,523,650 B1 | 2/2003 | Pribonic et al. |
| 6,533,083 B1 | 3/2003 | Pribonic et al. |
| 6,557,673 B1 | 5/2003 | Desta et al. |
| 6,561,451 B1 | 5/2003 | Steinich |
| 6,659,237 B1 | 12/2003 | Pribonic |
| 6,756,870 B2 | 6/2004 | Kuwahara |
| 6,793,203 B2 | 9/2004 | Heinrichs et al. |
| 6,810,997 B2 | 11/2004 | Schreiber et al. |
| 6,918,469 B1 | 7/2005 | Pribonic et al. |
| 6,962,235 B2 | 11/2005 | Leon |
| 6,973,999 B2 | 12/2005 | Ikuta et al. |
| 7,011,607 B2 | 3/2006 | Kolda et al. |
| 7,014,026 B2 | 3/2006 | Drussel et al. |
| 7,018,324 B1 | 3/2006 | Lin |
| 7,279,055 B2 | 10/2007 | Schuler |
| 7,281,612 B2 | 10/2007 | Hsieh |
| 7,281,620 B2 | 10/2007 | Wolner et al. |
| 7,513,334 B2 | 4/2009 | Calver |
| 7,528,514 B2 | 5/2009 | Cruz et al. |
| 7,984,796 B2 | 7/2011 | Pribonic |
| 8,037,978 B1 | 10/2011 | Boren |
| 8,272,476 B2 | 9/2012 | Hartman et al. |
| 8,424,460 B2 | 4/2013 | Lerner et al. |
| 8,490,751 B2 | 7/2013 | Allington et al. |
| 8,511,434 B2 | 8/2013 | Blomberg |
| 8,556,234 B2 | 10/2013 | Hartman et al. |
| 8,567,561 B2 | 10/2013 | Strasser et al. |
| 8,601,951 B2 | 12/2013 | Lerner |
| 8,851,235 B2 | 10/2014 | Allington et al. |
| 9,016,435 B2 | 4/2015 | Allington et al. |
| 9,199,103 B2 | 12/2015 | Hetrich et al. |
| 9,242,128 B2 | 1/2016 | Macy |
| 10,020,720 B2 | 7/2018 | Diehl et al. |
| 10,110,089 B2 * | 10/2018 | Diehl ...................... H02K 7/10 |
| 10,498,210 B2 * | 12/2019 | Diehl ................... H02K 49/046 |
| 10,518,115 B2 | 12/2019 | Allington et al. |
| 10,774,887 B2 | 9/2020 | Allington et al. |

(56) References Cited

U.S. PATENT DOCUMENTS

| | | |
|---|---|---|
| 10,873,242 B2 | 12/2020 | Diehl et al. |
| 10,971,988 B2 | 4/2021 | Diehl et al. |
| 11,515,776 B2 * | 11/2022 | Diehl .................. H02K 49/046 |
| 2002/0162477 A1 | 11/2002 | Palumbo |
| 2002/0179372 A1 | 12/2002 | Schreiber et al. |
| 2003/0116391 A1 | 6/2003 | Desta et al. |
| 2003/0168911 A1 | 9/2003 | Anwar |
| 2003/0211914 A1 | 11/2003 | Perkins et al. |
| 2004/0055836 A1 | 3/2004 | Pribonic et al. |
| 2004/0073346 A1 | 4/2004 | Roelleke |
| 2004/0168855 A1 | 9/2004 | Leon |
| 2004/0191401 A1 | 9/2004 | Bytnar et al. |
| 2005/0051659 A1 | 3/2005 | Wolner et al. |
| 2005/0082410 A1 | 4/2005 | Tanaka et al. |
| 2005/0117258 A1 | 6/2005 | Ohta et al. |
| 2005/0189830 A1 | 9/2005 | Corbin, III et al. |
| 2005/0263356 A1 | 12/2005 | Marzano et al. |
| 2006/0219498 A1 | 10/2006 | Organek et al. |
| 2006/0278478 A1 | 12/2006 | Pribonic et al. |
| 2007/0000741 A1 | 1/2007 | Pribonic et al. |
| 2007/0001048 A1 | 1/2007 | Wooster et al. |
| 2007/0135561 A1 | 6/2007 | Rath et al. |
| 2007/0228202 A1 | 10/2007 | Scharf et al. |
| 2007/0228713 A1 | 10/2007 | Takemura |
| 2007/0256906 A1 | 11/2007 | Jin et al. |
| 2008/0059028 A1 | 3/2008 | Willerton |
| 2008/0074223 A1 | 3/2008 | Pribonic |
| 2008/0087510 A1 | 4/2008 | Pribonic |
| 2008/0105503 A1 | 5/2008 | Pribonic |
| 2008/0106420 A1 | 5/2008 | Rohlf |
| 2008/0135579 A1 | 6/2008 | Bertram et al. |
| 2009/0026303 A1 | 1/2009 | Schmitz et al. |
| 2009/0032785 A1 | 2/2009 | Jones |
| 2009/0084883 A1 | 4/2009 | Casebolt et al. |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor |
| 2009/0319212 A1 | 12/2009 | Cech et al. |
| 2010/0032255 A1 | 2/2010 | Conti et al. |
| 2010/0065373 A1 | 3/2010 | Stone et al. |
| 2010/0112224 A1 | 5/2010 | Lott |
| 2010/0116922 A1 | 5/2010 | Choate et al. |
| 2010/0211239 A1 | 8/2010 | Christensen et al. |
| 2011/0084158 A1 | 4/2011 | Meillet et al. |
| 2011/0114907 A1 * | 5/2011 | Hartman .................. A62B 1/08 254/268 |
| 2011/0147125 A1 | 6/2011 | Blomberg |
| 2011/0166744 A1 | 7/2011 | Lu et al. |
| 2011/0174914 A1 | 7/2011 | Yang |
| 2011/0175473 A1 | 7/2011 | Kitabatake et al. |
| 2011/0240403 A1 | 10/2011 | Meillet |
| 2011/0297778 A1 | 12/2011 | Meillet et al. |
| 2012/0055740 A1 * | 3/2012 | Allington .................. A62B 1/10 182/231 |
| 2012/0118670 A1 | 5/2012 | Olson et al. |
| 2012/0312540 A1 | 12/2012 | Lefebvre |
| 2013/0048422 A1 | 2/2013 | Hartman et al. |
| 2013/0087433 A1 | 4/2013 | Sejourne |
| 2013/0118842 A1 | 5/2013 | Lerner |
| 2013/0186721 A1 | 7/2013 | Bogdanowicz et al. |
| 2014/0048639 A1 | 2/2014 | Allington et al. |
| 2014/0110947 A1 | 4/2014 | Mongeau |
| 2014/0224597 A1 | 8/2014 | Takezawa et al. |
| 2014/0346909 A1 | 11/2014 | Vogler et al. |
| 2014/0375158 A1 | 12/2014 | Allington et al. |
| 2015/0196820 A1 | 7/2015 | Allington et al. |
| 2015/0266454 A1 | 9/2015 | McGowan |
| 2015/0352380 A1 | 12/2015 | Huang et al. |
| 2016/0052401 A1 | 2/2016 | McGowan et al. |
| 2016/0317936 A1 | 11/2016 | Diehl et al. |
| 2016/0360738 A1 | 12/2016 | Richardson |
| 2017/0237313 A1 | 8/2017 | Diehl et al. |
| 2017/0244313 A1 | 8/2017 | Diehl et al. |
| 2017/0274261 A1 | 9/2017 | Allington et al. |
| 2017/0328424 A1 | 11/2017 | Allington et al. |
| 2017/0338728 A1 | 11/2017 | Diehl et al. |
| 2018/0245658 A1 | 8/2018 | Diehl et al. |
| 2018/0264296 A1 | 9/2018 | Diehl et al. |
| 2018/0269767 A1 | 9/2018 | Diehl et al. |
| 2018/0269768 A1 | 9/2018 | Diehl et al. |
| 2018/0269769 A1 | 9/2018 | Allington et al. |
| 2018/0370484 A1 | 12/2018 | Diehl et al. |

FOREIGN PATENT DOCUMENTS

| | | |
|---|---|---|
| CN | 202203305 U | 4/2012 |
| CN | 102497085 A | 6/2012 |
| CN | 102627063 A | 8/2012 |
| CN | 102652029 A | 8/2012 |
| CN | 103244577 A | 8/2013 |
| CN | 103326538 A | 9/2013 |
| DE | 9300966 U1 | 3/1993 |
| DE | 102005032694 A1 | 1/2007 |
| EP | 0247818 A2 | 12/1987 |
| EP | 0460494 A1 | 12/1991 |
| EP | 0909684 A2 | 4/1999 |
| EP | 1094240 A2 | 4/2001 |
| EP | 1401087 A1 | 3/2004 |
| EP | 1432101 A1 | 6/2004 |
| EP | 1480320 A1 | 11/2004 |
| EP | 1564868 A1 | 8/2005 |
| EP | 1244565 B1 | 7/2006 |
| GB | 721748 A | 1/1955 |
| GB | 908128 A | 10/1962 |
| GB | 2340461 A | 2/2000 |
| GB | 2352644 A | 2/2001 |
| GB | 2352645 A | 2/2001 |
| GB | 2352784 A | 2/2001 |
| GB | 2357563 A | 6/2001 |
| JP | S4712243 U | 10/1972 |
| JP | 49097163 A | 9/1974 |
| JP | S53113528 U | 9/1978 |
| JP | 56107092 U | 8/1981 |
| JP | 5825152 U | 2/1983 |
| JP | 60259278 A | 12/1985 |
| JP | 6364542 A | 3/1988 |
| JP | 572684 A | 3/1993 |
| JP | 5296287 A | 11/1993 |
| JP | H0584347 U | 11/1993 |
| JP | 8252025 A | 10/1996 |
| JP | 1098868 A | 4/1998 |
| JP | 10140536 A | 5/1998 |
| JP | H10178717 A | 6/1998 |
| JP | 10304799 A | 11/1998 |
| JP | 11119680 A | 4/1999 |
| JP | 11189701 A | 7/1999 |
| JP | 11315662 A | 11/1999 |
| JP | 2000189530 A | 7/2000 |
| JP | 2000316272 A | 11/2000 |
| JP | 200117041 A | 1/2001 |
| JP | 2005353123 A | 12/2005 |
| JP | 2012152316 A | 8/2012 |
| RU | 106462 U1 | 7/2011 |
| WO | WO 9516496 A1 | 6/1995 |
| WO | WO 9617149 A1 | 6/1996 |
| WO | WO 9847215 A1 | 10/1998 |
| WO | WO 0138123 A1 | 5/2001 |
| WO | WO 03055560 A1 | 7/2003 |
| WO | WO 2007060053 A1 | 5/2007 |
| WO | WO 2008139127 A1 | 11/2008 |
| WO | WO 2009013479 A1 | 1/2009 |
| WO | WO 2009047469 A1 | 4/2009 |
| WO | WO 2009108040 A1 | 9/2009 |
| WO | WO 2009127142 A1 | 10/2009 |
| WO | WO 2010104405 A2 | 9/2010 |
| WO | WO 2011079266 A2 | 6/2011 |

OTHER PUBLICATIONS

Extended European Search Report, dated Jul. 11, 2017, for European Application No. 14872681.3-1809, (10 pages).

(56) References Cited

OTHER PUBLICATIONS

Extended European Search Report, dated Apr. 6, 2018, for European Application No. 15864540.8-1201, (26 pages).
Final Office Action, dated Feb. 28, 2017, for U.S. Appl. No. 14/464,255, Allington et al., "Braking Mechanisms," (10 pages).
International Search Report and Written Opinion, dated Feb. 13, 2009, for International Application No. PCT/US2008/087863, (15 pages).
International Search Report and Written Opinion, dated Feb. 23, 2011, for International Application No. PCT/NZ2010/00001 1, (10 pages).
International Search Report and Written Opinion, dated Mar. 11, 2015, for International Application No. PCT/NZ2014/000245, (8 pages).
International Search Report and Written Opinion, dated Oct. 26, 2015, for International Application No. PCT/NZ2015/050115, (10 pages).
International Search Report and Written Opinion, dated Nov. 18, 2015, for International Application No. PCT/NZ2015/050113, (9 pages).
International Search Report and Written Opinion, dated Nov. 11, 2015, for International Application No. PCT/NZ2015/050114, (10 pages).
International Search Report and Written Opinion, dated Jan. 29, 2016, for International Application No. PCT/NZ2015/050208, (11 pages).
International Search Report and Written Opinion, dated Feb. 24, 2016, for International Application No. PCT/NZ2015/050207, (10 pages).
International Search Report and Written Opinion, dated Mar. 18, 2016, for International Application No. PCT/NZ2015/050209, (14 pages).
International Search Report and Written Opinion, dated Mar. 29, 2016, for International Application No. PCT/NZ2015/050205, (10 pages).
International Search Report and Written Opinion, dated Apr. 1, 2016, for International Application No. PCT/NZ2015/050206, (9 pages).
MSA Safety Incorporated, Auto Belay Stop Use Notice, Oct. 15, 2009, URL=http://verticalendeavors.com/minneapolis/auto-belay-stop-us-notice/, download date Apr. 6, 2017, 2 pages.
North Safety Products Europe B.V., "Climbing Wall Descender: FP2/5**GDD," *Climbing Wall Descent Controllers Instruction Manual v3*, Aug. 18, 2008, 20 pages.
Notice of Allowance, dated Jul. 21, 2014, for U.S. Appl. No. 13/255,625, Allington et al., "Braking Mechanisms," (11 pages).
Office Action, dated Jan. 9, 2014, for U.S. Appl. No. 13/255,625, Allington et al., "Braking Mechanisms," (9 pages).
Office Action, dated Jul. 25, 2016, for U.S. Appl. No. 14/464,255, Allington et al., "Braking Mechanisms," (10 pages).
Office Action, dated Aug. 22, 2017, for U.S. Appl. No. 14/464,255, Allington et al., "Braking Mechanisms," (5 pages).
Office Action, dated Jan. 17, 2018, for U.S. Appl. No. 15/586,111, Allington et al., "Braking Mechanisms," (15 pages).
Office Action, dated Feb. 20, 2018, for U.S. Appl. No. 14/464,255, Allington et al., "Braking Mechanisms," (15 pages).
Park et al., "Torque analysis and measurements of a permanent magnet type Eddy current brake with a Halbach magnet array based on analytical magnetic field calculations," *Journal of Applied Physics* 115(17):17E707, 2014. (3 pages).
TRUBLUE Auto Belays, Model TB150-12C Operator Manual, Jun. 20, 2013, 37 pages.

* cited by examiner

TUNING OF A KINEMATIC RELATIONSHIP BETWEEN MEMBERS

RELATED APPLICATIONS

This application derives priority from New Zealand patent application number 627633 incorporated herein by reference.

BACKGROUND

Technical Field

Described herein is a device comprising members in a kinematic relationship, the kinematic relationship at least partially governed by at least one magnetic flux interaction that, in effect, may provide a tunable resistance to movement, changing the rate of relative movement between the members.

Description of the Related Art

Eddy current formation may be used in a variety of ways to adjust the rate of movement of a member. Various apparatus exist, for example in abseiling, to control the descent of a climber or for example, in personal protective equipment scenarios to prevent an injury causing fall. Other applications that use eddy current generation are in controlling pay-out of line in trains, cable cars, zip line devices and roller coasters.

One art device is published as US2012/0055740. This device utilizes a rotor assembly with arms that move relative to the rotor. The arms themselves may be conductive or magnetic or may have conductive or magnetic members attached thereto. When a rotational force is applied to the rotor, the arms move outwards from a central axis via centrifugal force and into a magnetic (or conductive) field. As the arms move through the field, eddy currents are generated, the strength of which is dependent on the speed of rotation. As the speed of rotation reduces, the arms are drawn back towards the axis of rotation via springs and/or a reduced centrifugal force acting on the arms. This device is widely used and provides an excellent means of changing the relative speed of parts.

One aspect of the above apparatus is that control on the speed of activation of the braking effect caused by movement of the arms into the magnetic field can only be tuned by adjusting a few variables including bias strength, arm weight (and hence inertia) and pivot axis placement—influenced by either the degree of offset from a center of mass of the arm and/or the degree of offset of the pivot axis from the rotor axis.

Tuning movement of the arms once movement commences via an additional input may also be useful depending on the end application of the device or at least it provides the public with a choice.

Further aspects and advantages of the device will become apparent from the ensuing description that is given by way of example only.

BRIEF SUMMARY

Described herein is a device comprising members in a kinematic relationship, the kinematic relationship at least partially governed by at least one magnetic flux interaction that, in effect, may provide a tunable resistance to movement, changing the rate of relative movement between the members.

In a first aspect, there is provided a device comprising:

at least one first member in a kinematic relationship with at least one further member to form a system, the system moving within a limited range of motion and wherein the system interacts when an external energizing force is imposed on the system causing the members to respond due to their kinematic and dynamic characteristics and thereby creating relative motion between the members;

at least one trigger member coupled to the at least the first member that moves in response to a pre-determined system movement and, when the at least one trigger member moves, the at least one trigger member or a part thereof imposes a braking action on the system or a member or members thereof; and, wherein the speed and/or intensity of the braking action imposed by the at least one trigger member on the system or a member or members thereof is controlled by the at least one trigger member rate of movement and this rate of movement is in turn governed by a magnetic flux interaction between the at least one trigger member or a part thereof and the at least one first member or a part thereof causing formation of a magnetically induced eddy current force between the at least one trigger member or a part thereof and the at least one first member or a part thereof.

In a second aspect, there is provided a line dispensing device incorporating at least one device substantially as described above.

In a third aspect, there is provided a passenger seat restraint incorporating at least one device substantially as described above.

In a fourth aspect, there is provided a transmission drive incorporating at least one device to engage a rotational drive substantially as described above.

In a fifth aspect, there is provided a linear guided lifeline incorporating at least one device substantially as described above.

Numerous other applications of the device may also be possible as further outlined in the description below.

One advantage of the above device includes the ability to control the rate of movement prescribed by the kinematic relationship. In addition, a further advantage of the device is to also influence the kinematic relationship once movement commences. The magnitude of the resistance to movement may be varied in a consistent manner as the members move or in a stepped or otherwise varied manner. Tuning in this way may have the effect of avoiding unwanted activation or slowing the speed of activation of, for example, a brake engagement.

BRIEF DESCRIPTION OF THE SEVERAL VIEWS OF THE DRAWINGS

Further aspects of the device will become apparent from the following description that is given by way of example only and with reference to the accompanying drawings in which.

DETAILED DESCRIPTION

Figure 1:
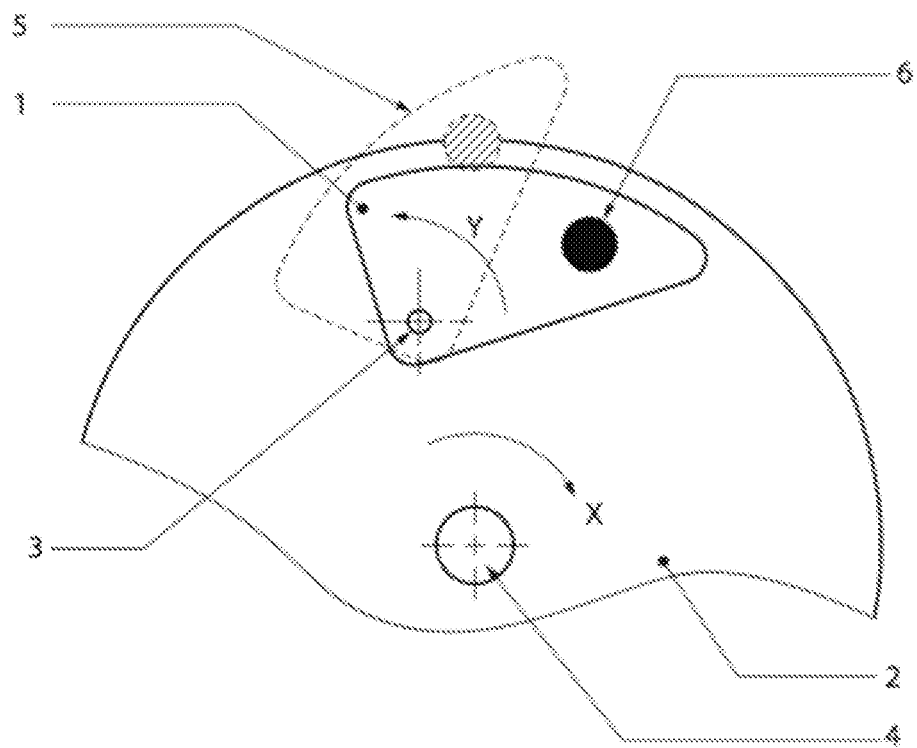
FIG. 1 illustrates a side view of one embodiment of a device with the trigger and first members in a magnetic relationship.

As noted above, described herein is a device comprising members in a kinematic relationship, the kinematic relationship at least partially governed by at least one magnetic flux interaction that, in effect, may provide a tunable resistance to movement, changing the rate of relative movement between the members.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e., that it will be taken to mean an inclusion of not only the listed components it directly references, but also other non-specified components or elements.

The term 'energizing force' and grammatical variations thereof refers to a force that acts to impose a rate of movement on an object.

The term 'dynamic' and grammatical variations thereof in the context of device or device part movement refers to forces induced by mechanical means.

In a first aspect, there is provided a device comprising:

at least one first member in a kinematic relationship with at least one further member to form a system, the system moving within a limited range of motion and wherein the system interacts when an external energizing force is imposed on the system causing the members to respond due to their kinematic and dynamic characteristics and thereby creating relative motion between the members;

at least one trigger member coupled to the at least the first member that moves in response to a pre-determined system movement and, when the at least one trigger member moves, the at least one trigger member or a part thereof imposes a braking action on the system or a member or members thereof; and, wherein the speed and/or intensity of the braking action imposed by the at least one trigger member on the system or a member or members thereof is controlled by the at least one trigger member rate of movement and this rate of movement is in turn governed by a magnetic flux interaction between the at least one trigger member or a part thereof and the at least one first member or a part thereof causing formation of a magnetically induced eddy current force between the at least one trigger member or a part thereof and the at least one first member or a part thereof.

In one embodiment, the at least one trigger member may comprise a magnetic part or parts that interact with a conductor part or parts on the at least one first member. Alternatively, the at least one trigger member may comprise a conductor part or parts that interact with a magnetic part or parts on the at least one first member.

The kinematic relationship between the system movement and the at least one trigger movement may be a non-linear response. The rate of movement of the at least one trigger member relative to the first member may slow as relative motion occurs. Alternatively, the rate of movement of the at least one trigger member relative to the first member may speed up as relative motion occurs. Further, the rate of movement of the at least one trigger member relative to the first member may cycle at least once between slower and faster relative motion. In one embodiment, a comparatively rapid change in rate of movement of the members may occur when the at least one trigger member and at least one first member move sufficiently far apart to cause a reduction in magnetic flux interaction between the members. For example, when the magnetic flux terminates the trigger and first members are able to move freely with no eddy current induced resistance. The transition from resistance to no resistance may be abrupt leading to a rapid change in rate of movement as noted above.

The device action may be further characterized by a variable and pre-determined rate of motion of the trigger member relative to the first member, the rate being determined by tuning the magnetic flux between the members. By way of example, the comparative rate of movement between the members may vary from fast, to slow, to moderately fast, before the members move apart and the eddy current induced force dissipates altogether.

Relative movement between the system and the at least one trigger member may be delayed until the pre-determined system movement occurs.

The system braking action imposed by the at least one trigger member or a part thereof may be caused by: latching, friction force, magnetic force interactions, and combinations thereof.

The rate at which the at least one trigger member moves relative to the at least one first member may be tuned by varying the resulting eddy current force between the at least one trigger member and the at least one first member.

The magnetically induced eddy current force may be tuned by varying at least one of:

(a) the magnetic element surface area on or within the at least one trigger member or at least one first member;

(b) the conductive region on or within the at least one trigger member or at least one first member;

(c) the proximity of at least one magnetic element and at least one conductive region on the at least one trigger member and at least one first member;

(d) the geometry and/or magnetic properties of the at least one magnetic element on or within the at least one trigger member or at least one first member;

(e) the geometry and/or electrical properties of the at least one conductive element on or within the at least one trigger member or at least one first member;

(f) and combinations thereof.

For example, the trigger member may include a magnetic element, the magnetic strength varying along the direction of travel. As the trigger member moves relative to the first member, the magnetic flux varies and therefore the eddy current induced force varies along the prescribed path of movement of the members.

As should be appreciated from the above, the members may take various shapes or weights, factors that influence the activation and/or rate of motion of the member or members during movement. The interaction may for example be continuous across a trigger and/or first member length or spaced apart or of varying dimensions to thereby adjust the flux occurring. The interacting portion of the trigger or other members may be the whole member or only a portion thereof. Where only a portion of the member interacts, the location of the interacting portion either on the exterior, interior or part of the member, can be altered.

The at least one trigger member and at least one first member may be positioned so that an immediate magnetically induced eddy current force induction occurs as soon as relative movement occurs between the members. In effect this means that when in an at rest position, the at least one trigger member and at least one first member are at least in part in a magnetic relationship together. As noted above however, the eddy current induced force may be tuned and, for example, the magnetic flux interaction may only commence after a degree of movement of the members and the above example should not be seen as limiting.

Movement of the trigger member described above may be direct—that is the trigger member moves directly due to the energizing force. The trigger member may instead move indirectly or by proxy at least in part due to the energizing force causing at least one additional mechanical part or force dynamic to move or interact with the trigger member and thereby subsequently causing motion of the trigger member. Indirect means may be a dynamic force transfer via another part such as a coupling or gear or a centrifugal force being imposed on the trigger member by direct force on another part. Indirect or proxy force transfer may have the advantage of being able to amplify the energizing force.

Static or dynamic positional and/or strength adjustment of the point of action of the eddy current induced force may also be completed by:

(a) adjusting the position of the magnetic element or conductive region on the trigger member as the trigger member or first member moves; and/or, (b) adjusting the position of the magnetic element or conductive region on the first member as the trigger member or first member moves.

By way of example, the trigger member may comprise a slot and a portion of the trigger member comprising the magnetic element or conductive region moves within the slot as the trigger member as a whole moves on application of the energizing force. This additional means of adjusting movement may be useful to further alter the force dynamics and hence the way the parts interact. For example, in a rotary movement embodiment where the trigger member induces an eddy current drag force on overall system movement, positional adjustment may affect both the eddy current drag force and position which in turn may alter the resisting torque on the trigger member. In a linear movement embodiment, positional adjustment might affect the eddy current force generated.

Relative movement between the trigger member and additional member or members may be frictionless. Magnetic forces such as the induced force noted above and any subsequent forces acting on the trigger member may avoid friction contact. This may be useful to minimize mechanical wearing on the parts.

In one embodiment, movement between the parts may be predominantly governed by dynamic forces. The device may be free of liquid fluid with all movement between the parts due to dynamic forces. Alternatively, the device may have some liquid fluid present but the predominant energizing force on the device members may be dynamic force. Liquid based systems utilizing magnetics to alter kinematic relationships exist but these devices differ to that described herein in that that are often bi-stable—that is, the parts are only stable in two positions. In addition, movement predominantly or wholly relies on a force or pressure build up from the liquid fluid as opposed to dynamic forces. Liquid based devices also have inherent difficulties associated with sealing the liquid and more regular maintenance being required to ensure reliable running.

As may be appreciated from the above, the at least one trigger member and at least one first member have a magnetic flux interaction leading to magnetically induced eddy current forces. The magnetic flux interaction may be provided by use of at least one magnetic element located on or within the at least one trigger member interacting with an electrically conductive region either on or within the at least one first member. Alternatively, the at least one magnetic flux interaction may be provided by use of at least one magnetic element located on or within the at least one first member interacting with a conductive region either on or within the trigger member. As should be appreciated, a wide variety of configurations may be undertaken to achieve the above relationships which assists with making the device very flexible as to exact design. In one embodiment, the whole trigger member may be magnetic or conductive and similarly, the whole first member may be magnetic or conductive. Alternatively, parts or regions of either member may be magnetic or conductive. Designs of member may also integrate the ability to remove and replace magnetic elements and/or conductive elements. Additionally, it should be appreciated that the term 'conductive' in the context of the above described magnet relationships refers to a material that a magnet interacts with that is electrically conductive. Further, the material may be ferromagnetic, or the material may be paramagnetic. The term 'conductive' should not be seen as limiting in terms of magnetic characteristics.

In one alternative embodiment, the device may include at least one second member independent to the at least one first member, the second member magnetically interacting with the at least one trigger member about at least a part of the at least one trigger member outside an area overlapping the at least one first member. This second member may be a series of magnets or conductive members and, when the trigger member moves into a region complementary to the second member, an eddy current induced force occurs between the trigger and second members. In one example, the second member may be stationary. Alternatively, the second member may move at a different relative speed to the at least one trigger member either in the same direction as the trigger member (but different speed) or, in an opposing direction.

In one variation on the above embodiment, the at least one first member may be fixed and the at least one trigger member moves on application of the energizing force, the movement of the at least one trigger member being urged by at least partial magnetic interaction with the at least one second member and, wherein movement of the at least one trigger member then induces a magnetic flux interaction between the at least one trigger member and at least one first member. The kinematic relationship in this variation may be prescribed by the at least one trigger member moving pivotally relative to the at least one first member. Alternatively, the kinematic relationship in this variation may be prescribed by the at least one trigger member moving via an independent translational path relative to the at least one first member.

In a further alternative, the at least one trigger member may engage with a further latching member or members upon relative movement of the at least one trigger member and at least one first member. Engagement of the trigger member and latching member may result in no further relative motion between the first member and the latching member. This latching member may be useful to constrain movement of the kinematic relationship. The engagement may be releasable so as to re-set the device for further movement.

The at least one trigger member and the at least one first member or parts thereof may be approximately adjacent to each other.

The magnetic flux interaction may be at least partially orthogonal to the direction of relative motion between the at least one trigger member and at least one first member. In one embodiment, the members lie in the same plane adjacent each other and, when an energizing force is applied, the members move past each other but remain in the same plane relative to each other. A magnetic field or fields may extend at right angles to the member movement. As may be appreciated, whilst fully orthogonal placement may be optimal, other planar angles may also achieve the same or similar outcomes.

The trigger member may be an arm shaped member that rotates about an axis when the pre-determined system movement occurs. The kinematic relationship may be at least in part prescribed by the at least one trigger member being pivotally attached to the at least one first member about an axis of rotation. The axis of rotation may be positioned so that movement of the first member causes rotational movement of the at least one trigger member about the axis of rotation. Movement of the at least one trigger member about the axis of rotation may rotate at least part of the at least one trigger member outside the area bound by the at least one first member. This kinematic relationship minimizes the number of parts needed yet confers a useful movement path. The pivot attachment may be by use of a mechanical fastener or fasteners, bearings or other known components. Movement of the member or members may be constrained within a predetermined range by use of a stop or other means to limit movement.

In one specific embodiment, movement of the at least one first member on application of the energizing force may be rotational movement. In this embodiment:
  The at least one first member may be a pawl or arm shaped member or members that are mechanically linked to a first member that is a rotor which rotates on application of the energizing force.
  The at least one trigger member may be positioned so that part of the at least one trigger member moves outside the region bound by the rotor on application of a sufficiently large energizing force.
  The at least one trigger member may be pivotally attached to the rotor about a pivot axis offset from the rotor axis.

The above embodiment may be useful to minimize the overall size of a device particularly where space does not allow for a linear track. The above device and mechanism may be integrated into a device similar to that described in US2012/0055740.

The at least one trigger member may alternatively be a rod shaped member that moves in a linear direction when the pre-determined system movement occurs. As noted, the kinematic relationship may be at least in part prescribed by the at least one trigger member moving via an independent translational path relative to the at least one first member. Movement of the at least one first member in this embodiment may be rotational about an axis of rotation such as where a rotor is used. Alternatively, movement of the at least one first member on application of an energizing force may be linear movement as in the example of using a carriage as the second member(s).

In a further alternative embodiment, movement of the at least one first member on application of the energizing force may be linear movement. In this embodiment:
  The at least one trigger member may be a pawl or arm shaped member or members that are mechanically linked to a first member that is a carriage which translates linearly on application of the energizing force.
  The at least one trigger member may be pivotally attached to the carriage about a pivot axis offset from the line of motion of the carriage.

Linear embodiments of this nature may be useful where the first member or members move along a track such as in applications using long guidelines, e.g., a train carriage or a gondola and the above described device acts to help brake the rate of movement of the carriage or gondola.

In a second aspect, there is provided a line dispensing device incorporating at least one device substantially as described above. Line dispensing devices such as auto belay devices are widely used to prevent falls in both recreational and industrial applications. In some cases, magnetically attracted relationships may be useful to tune the auto belay device characteristics. The at least one further member in the case of a line dispensing device may be a spool of line coupled directly or indirectly to the at least one first member. The external energizing force imposed on the system in this embodiment may be caused by line being extended from or retracted onto the spool.

In a third aspect, there is provided a passenger seat restraint incorporating webbing for extending and retracting, the webbing operatively coupled to at least one device substantially as described above. One example of a passenger seat restraint may be a seat belt used in a vehicle such as a car. Seat belts are a critical safety feature and the above described device may provide a useful alternative to existing designs particularly given the ability to tune the response in the wide variety of ways noted.

In a fourth aspect, there is provided a transmission drive incorporating at least one device to engage a rotational drive substantially as described above.

In a fifth aspect, there is provided a linear guided lifeline incorporating at least one device substantially as described above.

The above examples should not be seen as limiting since the devices described may be used for a wide variety of other applications, non-limiting examples including control of:
  a rotor in a rotary turbine;
  exercise equipment, e.g., rowing machines, epicyclic trainers;
  roller-coasters and other amusement rides;
  Elevator and escalator systems;
  evacuation descenders and fire escape devices;
  conveyer systems:
  rotary drives in factory production facilities;
  materials handling devices such as conveyer belts or a braking device in a chute;
  dynamic display signage to control the rate of change of rotating signs;

roadside safety systems, e.g., the eddy current brake may be connected in a system to provide crash attenuation though the dissipation of energy via the brake;
seat belts in vehicles;
braking mechanisms for trolleys and carriages.

As noted above, one advantage of the above device includes the ability to control the rate of movement prescribed by the kinematic relationship. In addition, a further advantage of the device is to also influence the kinematic relationship once movement commences. The magnitude of the resistance to movement may be varied in a consistent manner as the members move or in a stepped or otherwise varied manner. Tuning in this way may have the effect of avoiding unwanted activation or slowing the speed of activation of, for example, a brake engagement.

The embodiments described above may also be said to broadly consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as of individually set forth, Where specific integers are mentioned herein which have known equivalents in the art to which this invention relates, such known equivalents are deemed to be incorporated herein as if individually set forth.

WORKING EXAMPLES

The above described device is now described by reference to specific examples.

For ease of description in the examples, only a single trigger member and single first member are shown although it should be appreciated that multiple trigger and first members may be used.

Where described, a second member magnetic field through which the trigger member(s) move and a latching member are generally shown for prolixity as continuous regions. The second member, (if present at all) may for example be a series of discrete magnets or even just one magnet. Similarly, the latching member (if present) may take on various shapes or surface contours.

Example 1

Figure 2:
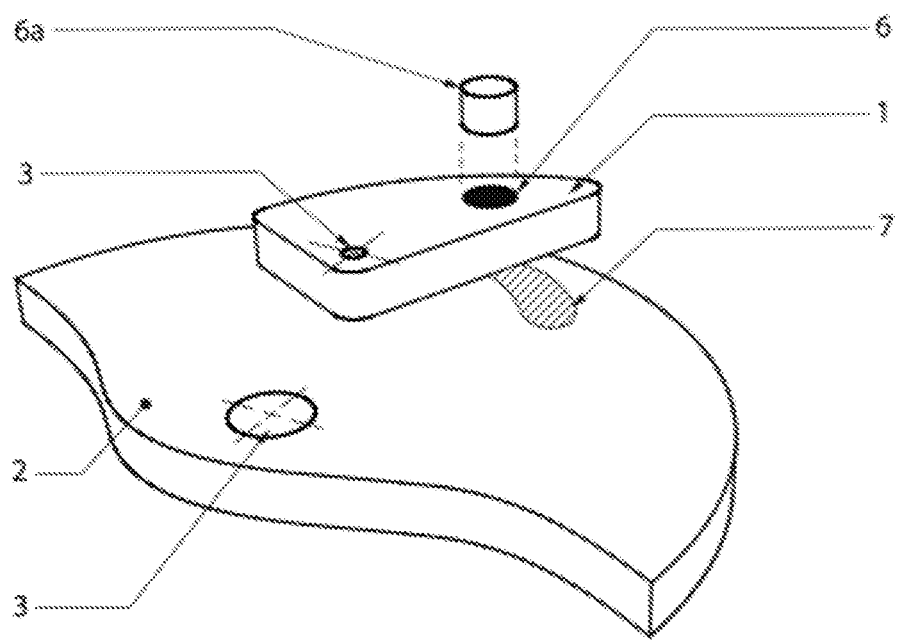
FIG. 2 illustrates an exploded perspective view of the trigger and first members in the embodiment described in FIG. 1.

As shown in FIGS. 1 and 2, a kinematic relationship between a trigger 1 and first member 2 is described. For ease of drawing, additional members and member details have been removed.

In the Example, the trigger member 1 is a pawl or arm that is pivotally linked to a first member 2 drawn as a rotor with part of the rotor area removed for clarity. The pivoting link provides a pivot axis of rotation 3 around which the trigger member 1 can rotate relative to the first member 2 or vice versa. In this Example, the first member 2 rotates in direction X about rotor axis 4 when an energizing force is applied. On application of the energizing force that rotates the rotor in direction X, the trigger member 1 will, through combination of centrifugal forces and inertial forces, be urged to pivot about the pivot axis 3 so that a part of the trigger member 1 moves. The solid line image of the trigger member 1 shows the pawl in a resting or trigger position while the dotted line shows the pawl in a second position post movement 5 showing the trigger member 1 rotating about the pivot axis 3 in direction Y.

As shown, the trigger member 1 and first member 2 are approximately adjacent each other and in a constrained kinematic relationship relative to each other.

The trigger member 1 and first member 2 are in a magnetic relationship. As shown in FIGS. 1 and 2, the trigger member 1 includes a magnetic element 6. The magnetic element 6 may be a portion of the trigger member 1. The magnetic element 6 may be a separate item (6a in FIG. 2) slotted into the trigger member 1 or hidden inside the trigger member 1 (not shown). On the first member 2 at a point complementary to the magnetic element 6 is a conductive region (shown as item 7 in FIG. 2). As should be appreciated, the magnetic element 6 and conductive region 7 described above may be swapped so that the trigger member 2 contains the conductive region and the first member 2 contains the magnetic element.

The magnetic element may be the whole trigger member 1 or may have differing shapes to that shown in FIGS. 1 and 2. Similarly, the conductive region 7 in the first member 2 may be the whole first member 2 or parts of the first member 2.

In action, as the varying rate of motion occurs, at least one magnetically induced flux results between the trigger member 1 and first member 2 thereby forming a magnetically induced eddy current force between the members 1, 2 or a part thereof.

The magnetically induced eddy current force may act to resist relative movement between the members 1, 2 and the at least one first member 2. The magnetic flux may be tuned by varying a number of characteristics of the arrangement including altering the magnetic element 6 and/or conductive region 7 size and positioning; altering the proximity of the trigger and first members thereby altering the proximity of the magnetic element 6 and conductive region 7; and finally altering the geometry and/or magnetic/conductive properties of the magnetic element(s) 6/conductive region(s) 7.

As shown in the Figures, the direction of the magnetically induced flux is in a direction substantially orthogonal to the direction of motion between the trigger member 1 and the first member 2 and the members 1, 2 lie in the same plane adjacent each other both at rest and during movement.

The embodiment described above may be integrated into a device similar to that described in US2012/0055740.

Example 2

Figure 3:
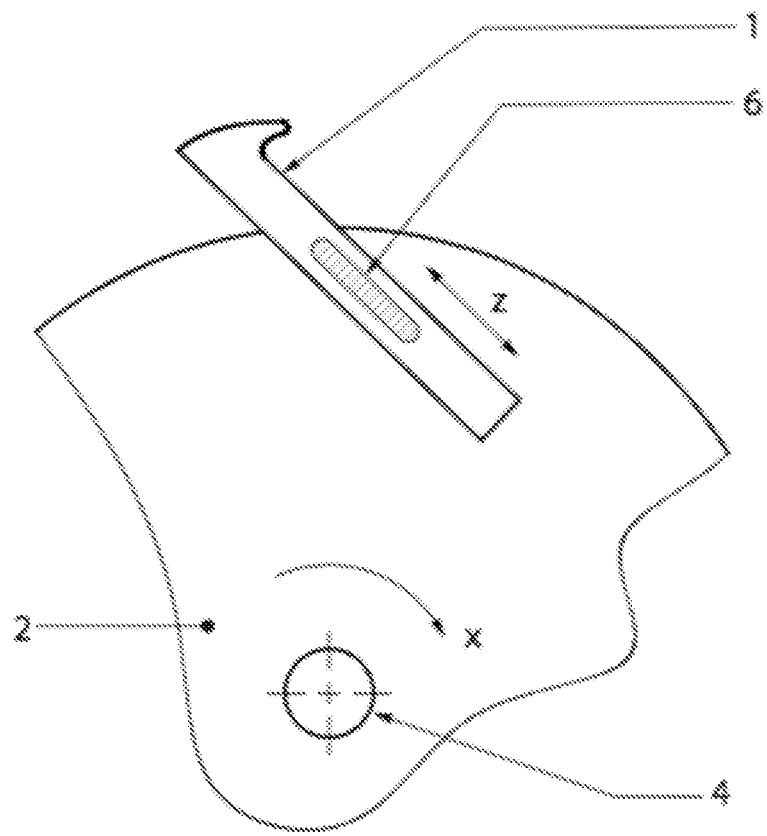
FIG. 3 illustrates a side view of an alternate embodiment incorporating a rod shaped trigger member.

Referring to FIG. 3, movement of the trigger member 1 may be linear in response to a rotational movement of the first member 2. As shown in FIG. 3, the trigger member 1 may be a rod, the rod slotting into a hole or indentation (not shown) in the first member 2. The rod 1 may include a magnetic element 6 (or conversely, a conductive region), the choice of a magnetic element or conductive region depend on what the complementary part is on the first member 2. When rotation of the first member 2 occurs, the rod moves out of the hole or indentation in a linear translation shown as an arrow along direction Z in FIG. 3.

Example 3

Figure 4:
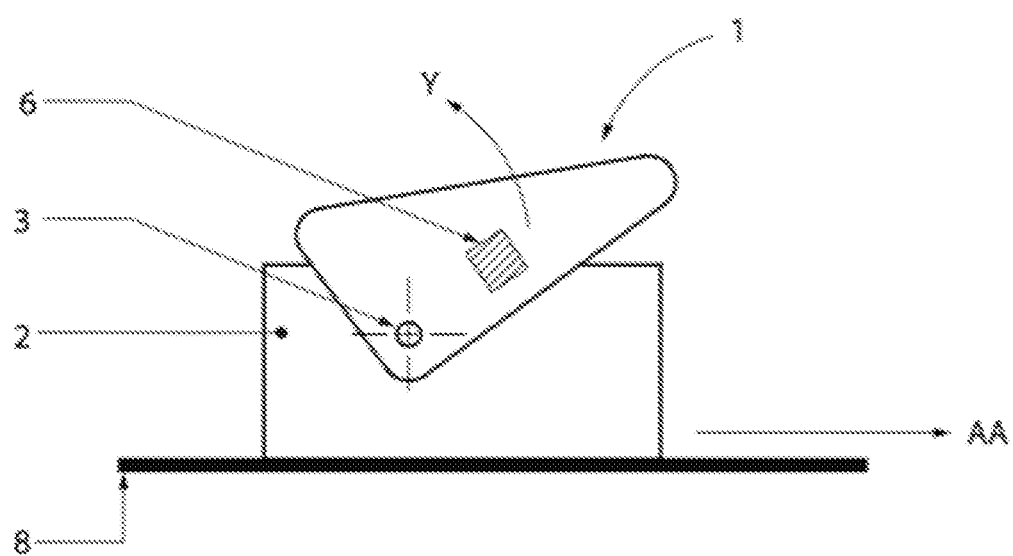
FIG. 4 illustrates a side view of an alternate embodiment incorporating a sliding first member and a pivoting trigger member pawl.
Figure 5:
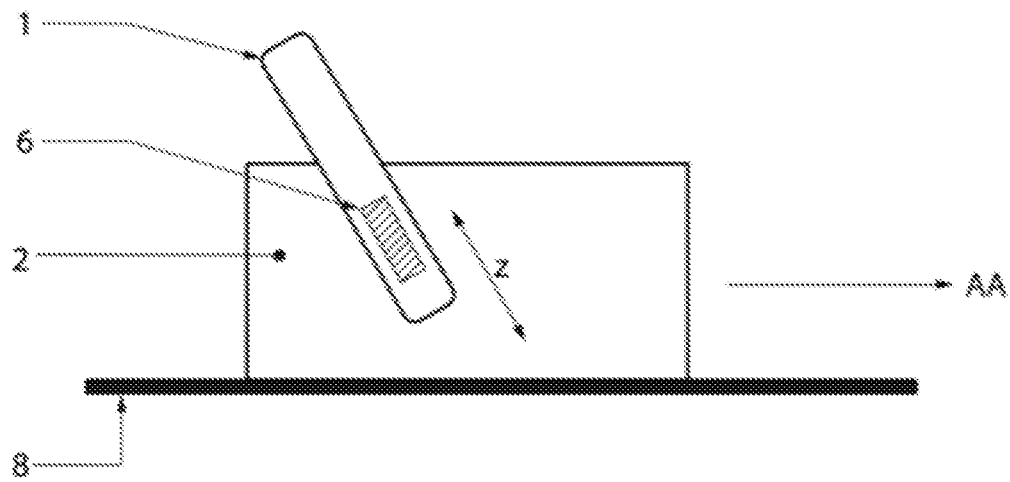
FIG. 5 illustrates a side view of an alternative embodiment to FIG. 4 incorporating a rod shaped first member.

FIGS. 4 and 5 illustrate an alternative embodiment where movement of the first member 2 occurs in a linear direction shown as arrow AA when an energizing force is applied.

The trigger member 1 may be a pawl or arm shaped member or members (one pawl shown for clarity) that are mechanically linked to a first member 2 that, in this example, is a carriage which translates linearly in direction AA on application of the energizing force along a surface or track 8.

In FIG. 4, the at least one trigger member 1 pivots about a pivot axis 3 attached to the carriage 2 about a pivot axis 3 offset from the direction of motion AA of the carriage. The trigger member 1 includes a magnetic element (or conductive region) 6 and the first member 2 includes a complementary magnetic element or region (not shown) so that the trigger and first members 1, 2 are in a magnetic relationship.

FIG. 5 illustrates the same principle of a linear movement first member 2, however in this case the trigger member 1 is a rod that moves in a linear manner as well, similar to that described in Example 2.

Linear embodiments of this nature may be useful where the first member 2 or members move along a track 8 such as in applications use long guidelines, e.g., a train carriage or a gondola and the above described device acts to help brake the rate of movement of the carriage or gondola.

Example 4

Figure 6:
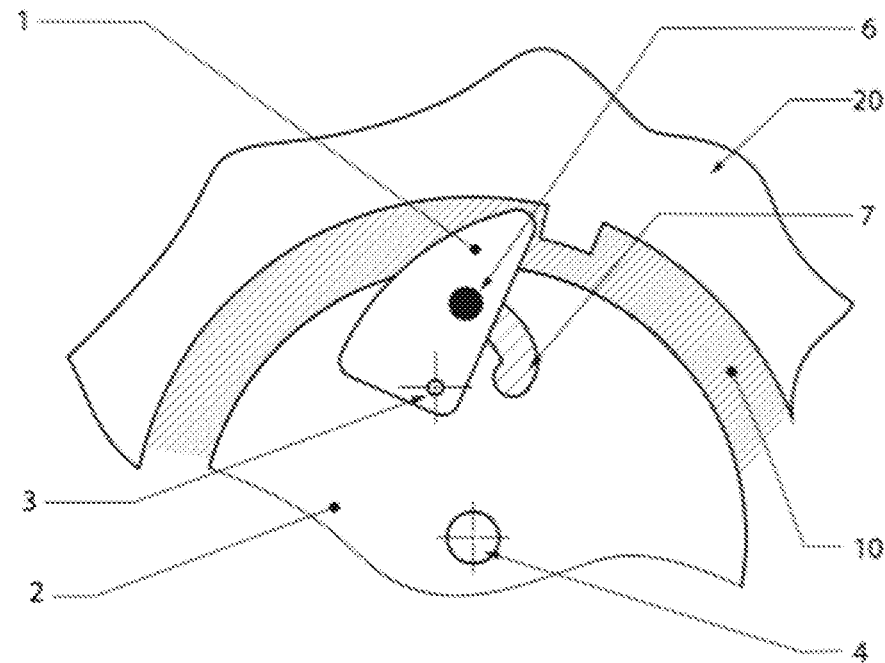
FIG. 6 illustrates a side view of an alternative embodiment with a second member and latching member.

FIG. 6 illustrate yet further embodiments of devices using the above described magnetic relationship between a trigger and first member 1, 2.

The device may include at least one second member 10 (drawn for ease of description as a shaded region) independent to the at least one first member 2, the second member 10 magnetically interacting with the trigger member 1 when the trigger member 1 moves away from the first member 2. This second member 10 may be a series of magnets or conductive regions and, when the trigger member 1 moves into a space complementary to the second member 10, an eddy current induced force occurs between the trigger 1 and second member 10.

The second member 10 may be stationary. Alternatively, the second member 10 may move at a different relative speed to the trigger member 1 either in the same direction as the trigger member 1 (but different speed) or, in an opposing direction.

The second member 10 may for example be a series of magnets (not shown) outside and around the circumference of the first member 2.

Example 5

Figure 7:
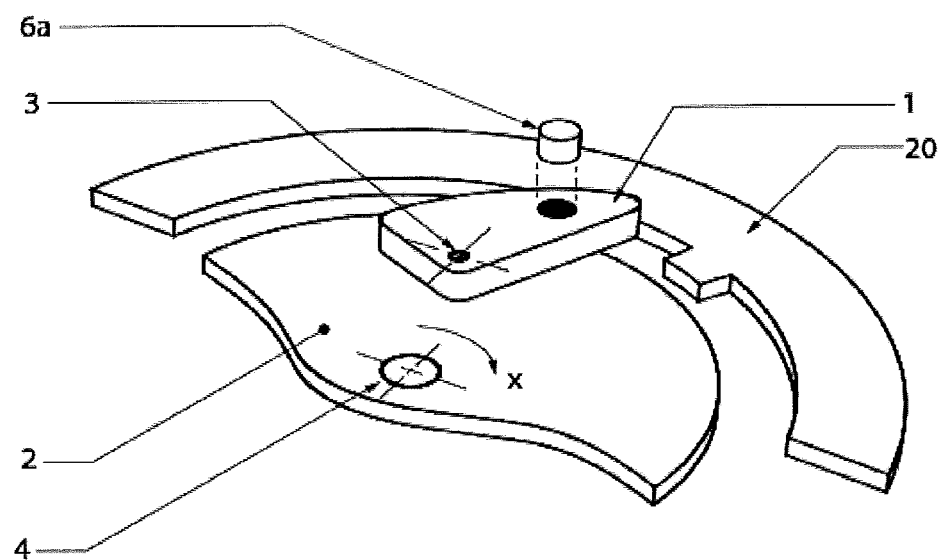
FIG. 7 illustrates an exploded perspective view of an alternative embodiment using a latching member.

As shown in FIGS. 6 and 7, the trigger member 1 may engage with a further latching member 20 upon movement of the trigger member 1 and first member 2. Engagement of the trigger member 1 and latching member 20 may result in no further relative motion between the first member 2 and the latching member 20. This latching member 20 may be useful to constrain movement of the kinematic relationship. The engagement may be releasable so as to re-set the device for further movement.

Example 6

Figure 8:
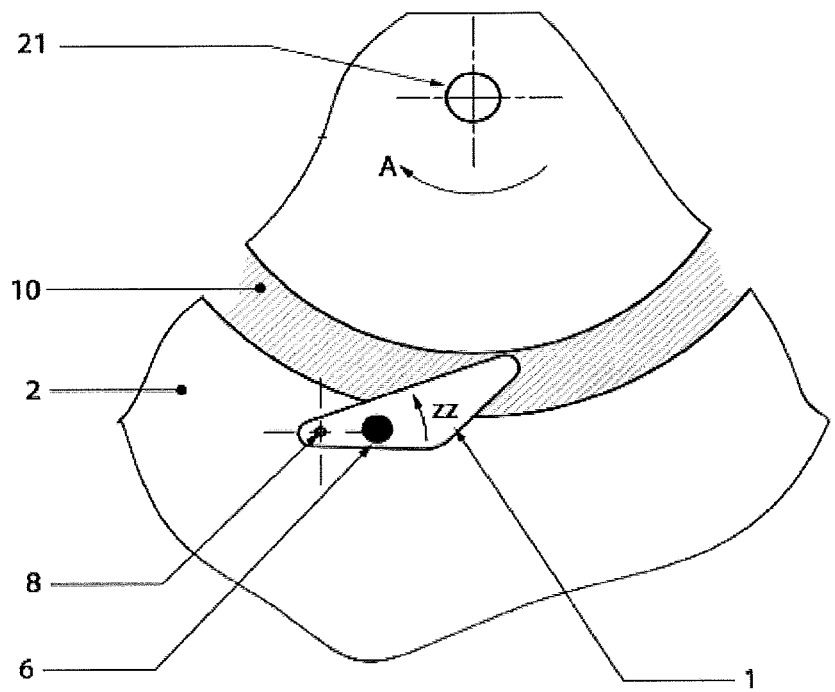
FIG. 8 illustrates a side view of a further alternative embodiment with a second member and stationary first member pivotally attached to a trigger member.
Figure 9:
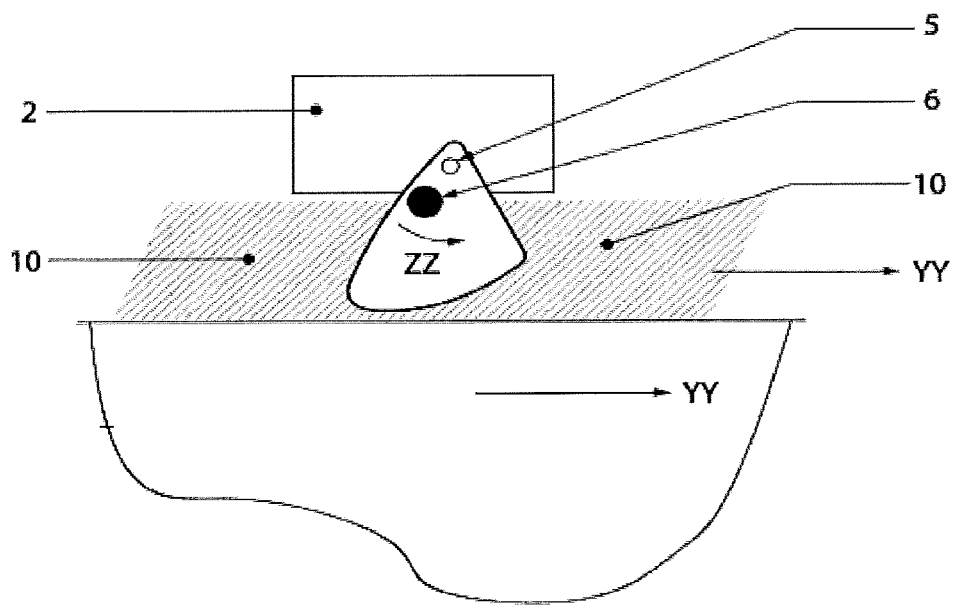
FIG. 9 illustrates a side view of a further alternative embodiment with a second member and stationary first member attached to a linearly translating trigger member.

FIGS. 8 and 9 illustrate a different approach using the second member 10.

As shown in the Figures, the second member 10 is independent to the first member 2. The second member 10 magnetically interacts with the trigger member 1 about part of the trigger member 1 that extends partly beyond the overlapping region between the trigger member 1 and first member 2. The second member 10 may be a series of magnets or conductive members complementary to the trigger member 1 so as to cause a magnetic flux interaction to occur when the second member 10 moves relative to the trigger member 1.

With the trigger member 1 in a region complementary to the second member 10, an energizing force on the second member 10 causes a magnetically induced eddy current force to occur between the trigger 1 and second members 10 that encourages movement of the trigger member 1 relative to the first member 2.

The first member 2 may be stationary and the trigger member 1 moves on application of the energizing force, the movement of the trigger member 1 then induces a magnetic flux interaction between the trigger member 1 and the first member 2.

As shown in FIG. 8, the kinematic relationship is prescribed by the trigger member 1 moving pivotally relative to the first member 2. Alternatively, and as shown in FIG. 9, the kinematic relationship may be prescribed by the trigger member 1 moving via an independent linear translational path relative to the first member 2.

Aspects of the device have been described by way of example only and it should be appreciated that modifications and additions may be made thereto without departing from the scope of the claims herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A device comprising:
   a first member in a kinematic relationship with a second member to form a system, the system moving within a limited range of motion and wherein the system interacts when an external energizing force is imposed on the system causing the first and second members to respond due to their kinematic and dynamic characteristics and thereby creating relative motion between the first and second members; and
   a pawl coupled to the first member, said pawl moving with respect to the first member in response to a predetermined system movement and, when the pawl moves, the pawl or a part thereof interacts with the second member,
   wherein the pawl and second member comprise one or more magnets or one or more conductive members so that, as relative motion occurs between the pawl and second member, a first eddy current braking force associated with a first eddy current braking action is induced between the pawl and second member that slows relative movement between the first member and second member,
   wherein the speed and/or intensity of the first eddy current braking action imposed by the pawl on the system or a member or members thereof is controlled by the pawl rate of movement with respect to the first member and, this rate of movement is in turn governed by a second eddy current braking action induced between the pawl or a part thereof and the first member or a part thereof, a second eddy current force associated with the second eddy current braking action resisting movement of the pawl with respect to the first member.

2. The device as claimed in claim 1 wherein the first member is a rotor that rotates and the pawl is located on the rotor and pivots outwards from the rotor to the second member.

3. The device as claimed in claim 1 wherein the first member is an outer member and the pawl is located on the outer member and pivots from the outer member inwards towards a second member.

4. The device as claimed in claim 1 wherein the first member is a carriage that moves via linear translation and the pawl is located on the carriage and translates or pivots from the carriage towards the second member.

5. The device as claimed in claim 1 wherein the second member interacts with the pawl to form the first eddy current braking force when a part of the pawl moves outside an area overlapping the first member.

6. The device as claimed in claim 1 wherein the pawl comprises a magnetic part or parts and, to cause the second eddy current braking action, the magnetic part or parts on the pawl interact with a conductive part or parts on the first member.

7. The device as claimed in claim 1 wherein the pawl comprises a conductive part or parts and, to cause the second eddy current braking action, the conductive part or parts on the pawl interact with a magnetic part or parts on the first member.

8. The device as claimed in claim 1 wherein the pawl comprises a magnetic part or parts and, to cause the first eddy current braking action, the magnetic part or parts on the pawl interact with a conductive part or parts on the second member.

9. The device as claimed in claim 1 wherein the pawl comprises a conductive part or parts and, to cause the first eddy current braking action, the conductive part or parts on the pawl interact with a magnetic part or parts on the second member.

10. The device as claimed in claim 1 wherein an extent of the second eddy current force and hence rate of movement at which the pawl moves relative to the first member is tuned by varying at least one of:

a surface area of a magnetic part on or within the pawl or first member;

a surface area of a conductive part on or within the pawl or first member;

the proximity of the magnetic part and the conductive part on the pawl and first member;

the geometry and/or magnetic properties of the magnetic part on or within the pawl or first member;

the geometry and/or electrical properties of the conductive part on or within the pawl or first member;

and combinations thereof.

11. A line dispensing device incorporating at least one device as claimed in claim 1 in which a spool of line is coupled directly or indirectly to the first member and wherein the external energizing force imposed on the system is caused by line being extended from or retracted onto the spool.

12. The device as claimed in claim 1 incorporated into a passenger seat restraint.

13. The device as claimed in claim 1 incorporated into a transmission drive.

14. The device as claimed in claim 1 incorporated into a linear guided lifeline.

* * * * *